United States Patent Office 3,003,354
Patented Oct. 10, 1961

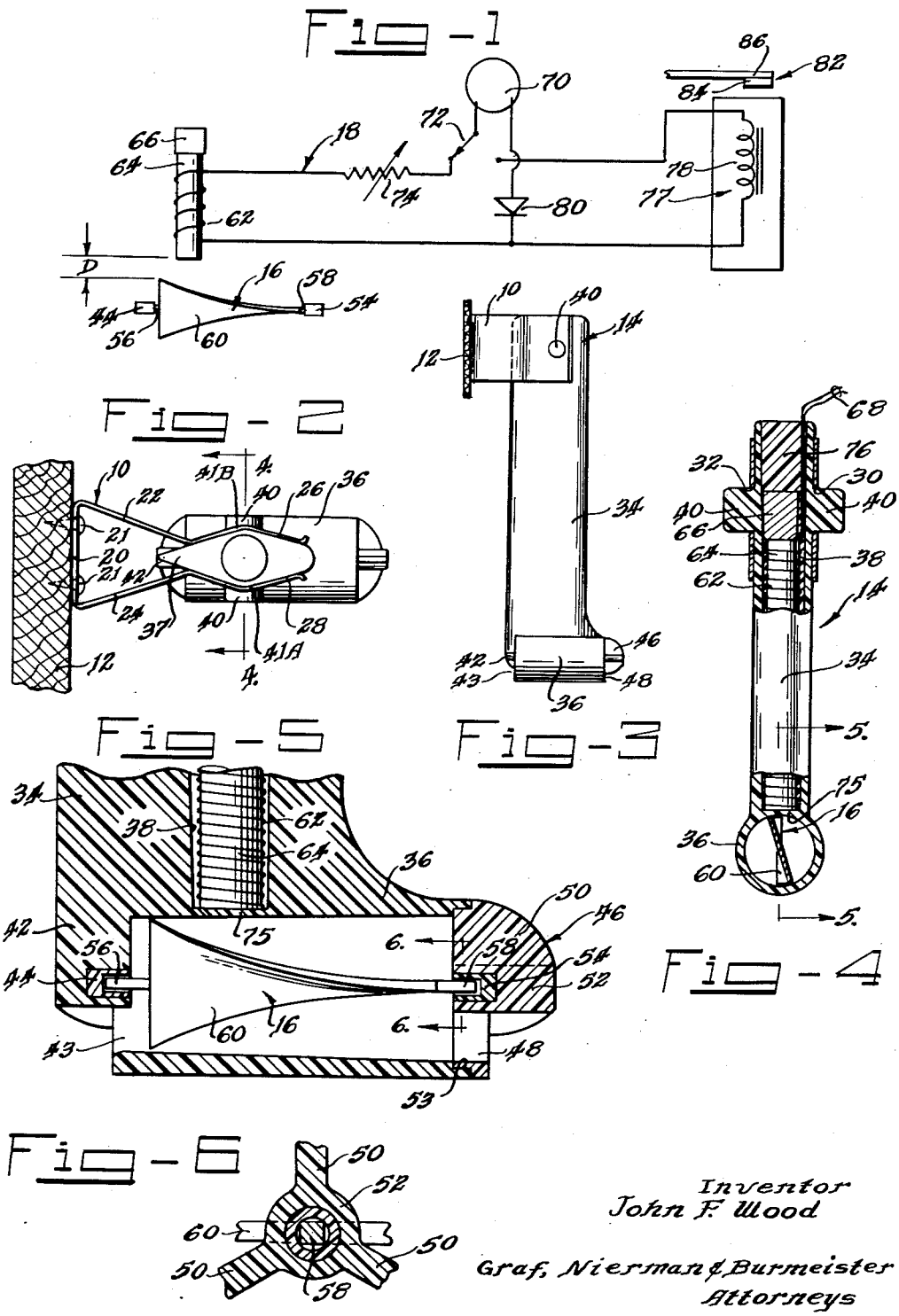

3,003,354
FLUID FLOW MEASURING DEVICE
John F. Wood, Buchanan, Mich., assignor to Electro-Voice, Incorporated, Buchanan, Mich., a corporation of Indiana
Filed June 26, 1959, Ser. No. 823,070
2 Claims. (Cl. 73—187)

The present invention relates to devices for measuring the rate of flow of fluids, particularly liquids, and more particularly to devices for measuring the speed of a boat sailing on water.

In the past, efforts have been made to measure the speed of a boat by positioning a rotor beneath the surface of the water and mechanically transmitting the rotational rate of the rotor to an electrical generator located above the surface of the water, and there generating an electrical potential responsive to the rotation rate of the rotor. Such systems have proven to be costly, and subject to faulty responses due to foreign objects, such as weeds, restricting the rotation rate of the rotor.

It is an object of the present invention to provide a speedometer which is substantially less susceptible to clogging by foreign particles, such as seaweed and the like, than the speedometers heretofore employed. It is also an object of the invention to provide a speedometer which may be more readily cleaned than the speedometers of the prior art.

It is a further object of the present invention to provide a speedometer for use on boats which requires no mechanical linkage from a rotor immersed in water to the electrical indicating means located above the surface of the water.

It is a further object of the present invention to provide a combination speedometer and tachometer for use on motorboats.

These and further objects of the present invention will be more fully appreciated upon a further reading of this disclosure, particularly when considered in the light of the drawings, in which:

FIGURE 1 is a diagrammatic view of an electromagnetic circuit embodying the present invention;

FIGURE 2 is a plan view of a flow indicating instrument embodying the present invention;

FIGURE 3 is a side elevational view of the instrument shown in FIGURE 2;

FIGURE 4 is a partly elevational and partly sectional view of the instrument of FIGURES 2 and 3, the section being taken on line 4—4 of FIGURE 2;

FIGURE 5 is an enlarged sectional view taken on line 5—5 of FIGURE 4; and

FIGURE 6 is an enlarged sectional view taken on line 6—6 of FIGURE 5.

The hydraulic flow indicating instrument illustrated in the figures generally includes a bracket 10 for securing the instrument to a supporting structure, such as a transom 12 at the stern of a boat, a housing 14 pivotally mounted on the bracket, a propeller or rotor 16 rotatably mounted in the housing, and a series electrical circuit generally indicated by numeral 18.

The bracket 10 which provides a support for the housing 14 is a unitary structure formed by a flat, narrow tempered spring steel strip. The bracket includes a base 20 which is secured to the transom 12 by a pair of screws 21. A pair of resilient legs 22 and 24 are formed integral with the base 20, and each resilient leg is identical in structure to the other resilient leg. The resilient legs 22 and 24 have confronting gripper portions 26 and 28, respectively, near the free ends thereof. The gripper portions 26 and 28 contain confronting apertures 30 and 32, respectively, to support the housing as will be hereinafter described.

The housing 14 is a molded resin unitary member and includes a stem 34 and a cylindrical tube 36 formed integral with and perpendicular to one end of the stem. The stem 34 has an air foil leading surface 37 to decrease the drag of the stem in a fluid. Core cavity 38 extends along the axis of the stem 34 and through substantially the entire length of the stem. A pair of aligned opposed ears 40 is formed integral with the stem on the end opposite the cylindrical tube. Each of the ears 40 pivotedly fits into the respective apertures 30 and 32 of the bracket 10. The aforementioned gripper portions 26 and 28 have confronting bends 41B and 41A, respectively, which conform to the outer surface of stem 34 to restrict the pivoting of the housing 14 in the bracket 10.

A three armed bearing support 42 is provided at the front end of the tube 36, thus forming three openings 43 for liquid at the front side of the housing 14, and a bearing 44 is secured therein. The rear end of the tube 36 receives a cap 46. The cap 46 has three equally spaced arms 50 supporting a bearing post 52 and forming three spaced annuli 48 therebetween. The cap 46, which is also a unitary molded resin structure, is cemented in a recess 53 in the open end of the tube 36. The bearing post 52 positions a bearing 54 fixed therein on the axis of the tube 36 and aligned with the aforementioned bearing 44. The bearings 44 and 54 are nylon in one construction, but may be of other conventional bearing materials.

The propeller 16, which is made of magnetically permeable material such as soft iron, is mounted in the two nylon bearings 44 and 54 in the tube 36. The propeller includes axially aligned shafts 56 and 58 which extend from opposite ends thereof and are rotatably mounted in bearings 44 and 54, respectively. The portion of the propeller between the shafts 56 and 58, referred to as a blade 60, has a 90 degree twist and a diameter slightly less than the inside diameter of the tube 36, so that the propeller is free to rotate in the tube 36.

The electrical circuit 18, illustrated in FIGURE 1, includes a coil 62 wound about a ferromagnetic core 64 and disposed in the cavity 38. The core 64 has a high magnetic permeability and is preferably of soft iron. A polarizing magnet 66 is positioned on top of the core 64 with one pole in contact with the core. The coil 62 is connected in a series circuit with an ammeter 70, a switch 72, a variable resistor 74 and a diode 80. The core 64 and the polarizing magnet 66 are sealed within the cavity 38 by a resin sealing compound 76 which also serves to lock the magnet, coil, and core in position, but the other elements of the series circuit are conveniently assembled exterior to the housing 14. FIGURE 1 illustrates that the minimum spacing D between the vane or blade 60 of propeller 16 and the core 64 within the core cavity 38 is relatively small and includes the wall 75 between the cavity 38 and the interior of the tube 36. In one construction of the present invention, the minimum distance from the core 64 to the blade 60 is 0.042 inch.

The hydraulic flow indicating instrument is assembled by positioning the assembled core 64, magnet 66, and coil 62 in the core cavity 38. The sealing compound 76 is then poured into the cavity 38 to seal the parts and secure them in position. The propeller 16 is placed inside the tube 36, and the cap 46 is cemented into the recess 52 in the end of the tube 36 so that the propeller is freely rotatable within the tube. At this point, the coil 62 may be connected to the other elements of the series circuit, and the indicator may be calibrated by immersing the tube 36 in water and moving the housing 14 relative to the water. It may be seen that the openings 43 in the housing 14 are recessed from the surface of the stem 34 to minimize collection of weeds and the like on the housing.

When the speedometer is employed on a boat, the housing 14 is held in an upright position by the bracket 10 and the coil is connected to the milliammeter 70. The boat may then be driven through the water so that water enters the openings 43, passes through the tube 36, and goes out through the cap 46. The flow of water through the tube 36 rotates the propeller 16 so that the edges of the blades are periodically positioned at the minimum distance of approximately 0.042 inch from the end of the core 64 and periodically at .296 inch from the end of the core to the propeller.

When the propeller is at a minimum distance from the core 64, the magnetic flux extending from the magnet 66 through the core 64 is substantially greater than during periods when the propeller is at a maximum distance from the core. The less the reluctance of the magnetic path of the magnetic circuit, the greater the flux passing through the coil 62. As the flux density through the core varies, an alternating electromotive force is generated in the coil 62 proportional to the rate of change of the flux, and the resulting current is rectified and measured by the milliammeter 70. The variable resistor 74 controls the amount of current flowing through the milliammeter 70. The rate at which the tube moves through the water determines the rate of the propeller, and hence the magnitude of the current generated in the series electrical circuit 18. The resistor 74 is used to adjust the magnitude of current so that the milliammeter 70 reads directly in knots or miles per hour.

The switch 72 is a single pole double throw switch that connects the milliammeter 70 to an electrical tachometer 77, so that the meter not only indicates the speed of the vehicle, but it indicates the rotation rate of the engine. The tachometer described in the patent application of Wood and Wirth entitled "Tachometer," filed February 13, 1958, Serial No. 715,031, is particularly suitable for the tachometer 77. This tachometer includes a pickup coil 78 which is mounted adjacent to a revolving magnetic field synchronized with the rotation rate of the engine, and a diode 80 connected in a series circuit with the milliammeter 70. The revolving magnetic field may be set up by a magneto 82 having a magnet 84 mounted on the periphery of a disc 86.

The grippers 26 and 28 of legs 22 and 24, respectively, hold the stem 34 in a vertical position so that the tube 36 is substantially parallel to the surface of the water. The housing is held firmly in position, but should the housing catch on seaweed or grass, the housing is not likely to be ripped off but rather it will tend to be pivoted upwardly. The force will spread legs 22 and 24 so that the housing may be pivoted upward. Thus, the danger of the housing being damaged in operation is minimized. Inasmuch as the housing has its core cavity sealed with a sealing compound, there is no danger that water will get into the core cavity to damage the coil.

Although the hydraulic flow indicating instrument has been described as being calibrated on a water vehicle, it is possible to calibrate the instrument in the factory so that it is not necessary to recalibrate the instrument when installing it on a water vehicle. Factory calibration is much the same as herein described, except that it is generally more convenient to move the water at a known rate relative to the tube rather than the tube relative to the water.

Although the flow indicating instrument has been described in terms of a speed indicator for a water vehicle, this instrument may be used to measure the flow of a fluid in a pipe by inserting the propeller in a section of pipe which section is nonmagnetic so that the magnetic flux will not be substantially affected by the pipe.

Although the present embodiment has been described with a magnet on top of the core with a highly permeable propeller, it is evident that the propeller may be made of a magnetic material such as Indox or Alnico and magnetized to provide a magnetic flux through the core and coil.

It is to be noted that a single current responsive meter 70 is employed to indicate both speed and engine revolutions. This construction makes it possible with only a switching operation to determine speed and revolutions of the motor under a given set of conditions so that the propeller pitch of the boat, and the like, may be properly adjusted.

The foregoing description and drawings are merely to explain and illustrate the invention. The invention is not limited thereto except insofar as the appended claims are so limited, since those skilled in the art who have the disclosure before them will be able to make modifications and variations therein without departing from the scope of the invention.

The invention claimed is:

1. A speedometer for a boat comprising a magnetic circuit including a source of magnetomotive force, a coil having a magnetically permeable core, and a magnetically permeable blade rotatably mounted adjacent to the core and spaced therefrom by a magnetic gap, rotation of the blade periodically varying the magnitude of the magnetic gap, means for immersing the blade in the water parallel to the direction of motion of the boat, and an electrical circuit for measuring the magnitude of the current generated in the coil, wherein the means for immersing the blade in water comprises a housing having an elongated stem, means for rotatably mounting the blade at one end of the stem, and a pair of ears adjacent the other end of the stem extending outwardly from opposite sides of the stem on an axis normal to the rotational axis of the blade, and a bracket adapted to be mounted to the stern of the boat having a pair of legs provided with confronting openings which engage the ears, the legs of the bracket conforming to the contour of the stem and being spring biased toward each other to grip the stem therebetween.

2. A speedometer for a boat comprising, in combination, a housing having an elongated cavity therein and a hollow tube adjacent to one end of the cavity, said tube having its axis substantially perpendicular to the axis of the cavity, a coil mounted in the cavity of the housing, an elongated core mounted within said coil and parallel to the axis of elongation of the cavity, a current indicating means electrically connected to the coil, means for establishing a magnetic flux through the core including a magnet having a steady magnetic field, and a magnetically permeable blade freely rotatably mounted in said tube having its axis of rotation parallel to the axis of the tube, said blade having an elongated plate shaped portion having a permanent twist about the rotational axis thereof and conducting flux of the magnetic field, whereby flow of fluid through the tube rotates the blade and periodically varies the reluctance of the magnetic path to induce a current in said coil which current is measured by the current measuring means to indicate the rate of flow of fluid through the tube, and wherein the housing is provided with an elongated stem extending normally from the hollow tube and a pair of ears extending from adjacent the end of the tube opposite the hollow tube, said ears extending outwardly from opposite sides of the stem on an axis normal to the rotational axis of the blade, in combination with a bracket adapted to be mounted to the stern of the boat having a pair of legs provided with confronting openings which engage the ears, the legs of the bracket conforming to the contour of the stem and being spring biased toward each other to grip the stem therebetween.

(References on following page)

References Cited in the file of this patent

UNITED STATES PATENTS

| | | |
|---|---|---|
| 591,162 | Fiske | Oct. 5, 1897 |
| 1,314,718 | Tesla | Sept. 2, 1919 |
| 2,060,721 | Bird | Nov. 10, 1936 |
| 2,089,134 | Petroff | Aug. 3, 1937 |
| 2,127,847 | Schulte | Aug. 23, 1938 |
| 2,270,141 | Potter | Jan. 13, 1942 |
| 2,301,115 | Gilbert | Nov. 3, 1942 |
| 2,411,613 | Bryant | Nov. 26, 1946 |
| 2,606,808 | Brown | Aug. 12, 1952 |
| 2,646,238 | Kircher et al. | July 21, 1953 |
| 2,683,224 | Colt | July 6, 1954 |
| 2,773,383 | Kersten | Dec. 11, 1956 |
| 2,882,727 | Newbold | Apr. 21, 1959 |

FOREIGN PATENTS

| | | |
|---|---|---|
| 598,635 | Great Britain | Feb. 23, 1948 |
| 758,755 | Great Britain | Oct. 10, 1956 |
| 803,069 | Great Britain | Oct. 15, 1958 |